(12) United States Patent
Saito

(10) Patent No.: US 8,489,294 B2
(45) Date of Patent: Jul. 16, 2013

(54) TRANSMISSION CONTROL DEVICE FOR AUTOMATIC TRANSMISSION

(75) Inventor: Yoichi Saito, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 255 days.

(21) Appl. No.: 13/093,961

(22) Filed: Apr. 26, 2011

(65) Prior Publication Data

US 2011/0270499 A1 Nov. 3, 2011

(30) Foreign Application Priority Data

Apr. 30, 2010 (JP) ................................. 2010-104975

(51) Int. Cl.
F16H 59/74 (2006.01)
(52) U.S. Cl.
USPC .............................................. 701/55; 701/51
(58) Field of Classification Search
USPC ............ 701/55, 51, 54, 64, 93, 110; 477/115; 123/339.1, 339.11, 399, 346, 348, 406.23
See application file for complete search history.

(56) References Cited

U.S. PATENT DOCUMENTS 5,826,208 A * 10/1998 Kuroiwa et al. ................ 701/54
6,014,604 A * 1/2000 Kuroiwa et al. ................ 701/54

FOREIGN PATENT DOCUMENTS

| JP | 2004183675 | * | 2/2004 |
| JP | 2004-183675 A | | 7/2004 |
| JP | 2006177425 | * | 1/2008 |

* cited by examiner

Primary Examiner — Marthe Marc-Coleman
(74) Attorney, Agent, or Firm — Smith, Gambrell and Russell, LLP

(57) ABSTRACT

Transmission control device for automatic transmissions that changes rotation output speed of turbocharged engines. An intake-state detecting unit detects an engine intake state and at least one of intake air amount, intake pressure, and engine air-fuel ratio. An intake-state determining unit determines whether a target intake state is satisfied based on detecting unit detection results and sets the target intake state based on target torque and engine operating range. A transmission-pattern selecting unit has a first transmission pattern for setting a transmission gear ratio based on an operational state and a second transmission pattern for setting the transmission gear ratio such that an engine rotation speed is higher than that in the first transmission pattern. The first or second transmission pattern choice is based on whether or not the target intake state is satisfied or not. A transmission controller controls a transmission mechanism based on the transmission pattern selection.

2 Claims, 4 Drawing Sheets

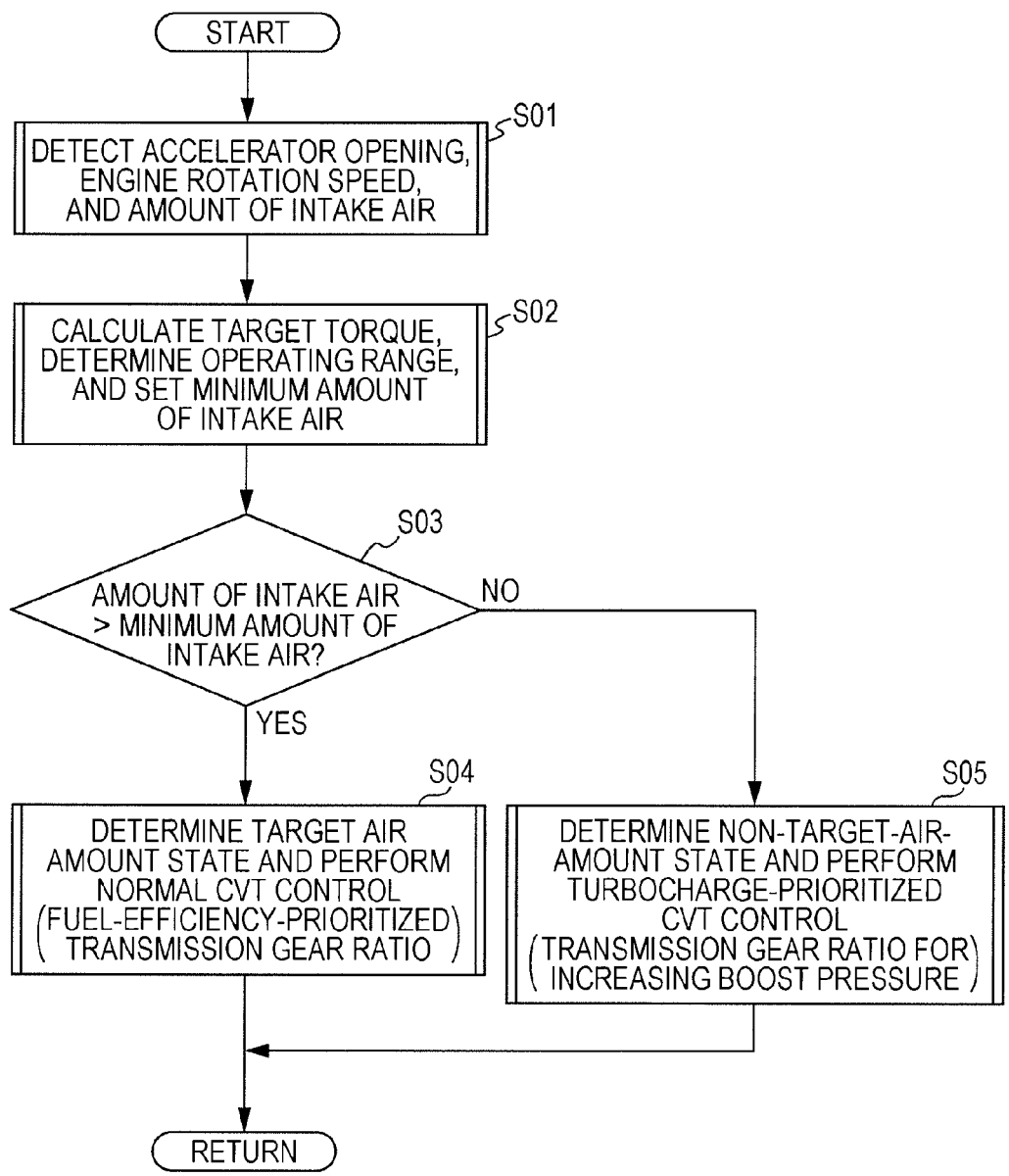

TRANSMISSION CONTROL DEVICE FOR AUTOMATIC TRANSMISSION

CROSS REFERENCE TO RELATED APPLICATIONS

The present application claims priority from Japanese Patent Application No. 2010-104975 filed on Apr. 30, 2010, the entire contents of which are hereby incorporated by reference.

BACKGROUND OF THE INVENTION

1. Field of the Invention

The present invention relates to a transmission control device for an automatic transmission that changes the speed of rotation output from an engine equipped with a turbocharger, and particularly, to a transmission control device for an automatic transmission that suppresses a reduction in fuel efficiency and improves the state of exhaust gas.

2. Description of the Related Art

For example, a diesel engine mounted in a vehicle, such as a passenger car, increases the amount of intake air by performing a turbocharging operation using a turbocharger or the like so as to set the vehicle in a lean fuel state during a normal running mode, thereby preventing the occurrence of particulate matter (PM), such as soot, which can occur due to a locally rich fuel state within a combustion chamber.

However, in a diesel engine in the related art, when the boost pressure is low, as in a low rotation period, and the amount of intake air is small, oxygen becomes insufficient during a high load period in which the amount of fuel injection increases, sometimes resulting in an increase in the amount of PM emission.

In contrast, increasing the frequency of use of a high rotation range of the engine by increasing the reduction gear ratio of a transmission can make it easier to ensure a sufficient amount of intake air in the engine. Although this may be advantageous in terms of a countermeasure against exhaust gas, frequent use of the high rotation range in this manner can lead to a reduction in fuel efficiency due to an increase in friction loss.

As an example of a related art technology that relates to transmission control performed in view of improving the state of exhaust gas of a diesel engine, Japanese Unexamined Patent Application Publication No. 2004-183675 discloses a technology of detecting an operational state in which black smoke tends to occur, such as when the vehicle is running at a high altitude, and controlling an automatic transmission within a low gear range.

However, even in a condition where there is a relatively low tendency for black smoke to occur, as in a standard atmospheric state at, for example, a low altitude, there is sometimes a time response lag until a target boost pressure is obtained in a transient operational state, such as starting and accelerating the vehicle from an idled state. This can result in an inability to achieve an appropriate operational state in terms of both exhaust gas and fuel efficiency.

SUMMARY OF THE INVENTION

An object of the present invention is to provide a transmission control device for an automatic transmission that suppresses a reduction in fuel efficiency and improves the state of exhaust gas.

The present invention solves the aforementioned problems by employing the following solutions.

An aspect of the present invention provides a transmission control device for an automatic transmission that changes the speed of rotation output from an engine having a turbocharger. The transmission control device includes intake-state detecting means configured to detect an intake state of the engine; intake-state determining means configured to determine whether or not a predetermined target intake state is satisfied on the basis of a detection result of the intake-state detecting means; transmission-pattern selecting means having a first transmission pattern for setting a transmission gear ratio in accordance with an operational state and a second transmission pattern for setting the transmission gear ratio such that an engine rotation speed is higher than that in the first transmission pattern, the transmission-pattern selecting means configured to select the first transmission pattern when the target intake state is satisfied and to select the second transmission pattern when the target intake state is not satisfied; and transmission control means configured to control a transmission mechanism unit of the automatic transmission on the basis of the transmission pattern selected by the transmission-pattern selecting means.

In the transmission control device for an automatic transmission according to the above aspect of the present invention, the intake-state detecting means may detect at least one of an amount of intake air in the engine, an intake pressure of the engine, and an air-fuel ratio of the engine, and the intake-state determining means may set the target intake state on the basis of a target torque and an operating range of the engine.

The present invention can achieve the following advantages.

1. When the target intake state is not satisfied due to an insufficient amount of intake air, the transmission pattern of the automatic transmission is changed from the first transmission pattern to the second transmission pattern so as to increase the engine rotation speed, thereby increasing the boost pressure of the turbocharger and thus increasing the amount of intake air in the engine. This allows for combustion in a lean fuel state so that the occurrence of PM is reduced, thereby improving the state of exhaust gas.

On the other hand, when the target intake state is satisfied and there is no problem in the state of exhaust gas, the first transmission pattern is used so as to reduce the engine rotation speed, thereby preventing a reduction in fuel efficiency.

2. The intake-state detecting means detects at least one of the amount of intake air in the engine, the intake pressure of the engine, and the air-fuel ratio of the engine, and the intake-state determining means sets the target intake state on the basis of the target torque and the operating range of the engine, whereby the determination of the aforementioned target intake state can be properly performed.

BRIEF DESCRIPTION OF THE DRAWINGS

FIG. 3 is a flow chart showing a transmission-pattern selecting process performed in the transmission control device for an automatic transmission according to the embodiment.

DESCRIPTION OF THE PREFERRED EMBODIMENTS

The present invention achieves the object of providing a transmission control device for an automatic transmission that suppresses a reduction in fuel efficiency and improves the state of exhaust gas by performing turbocharge-prioritized CVT control for increasing a reduction gear ratio when an actual amount of intake air in an engine is smaller than a target amount of intake air set on the basis of a driver's requested torque and an operating range.

Embodiment

An embodiment of a transmission control device for an automatic transmission to which the present invention is applied will be described below.

Figure 1:
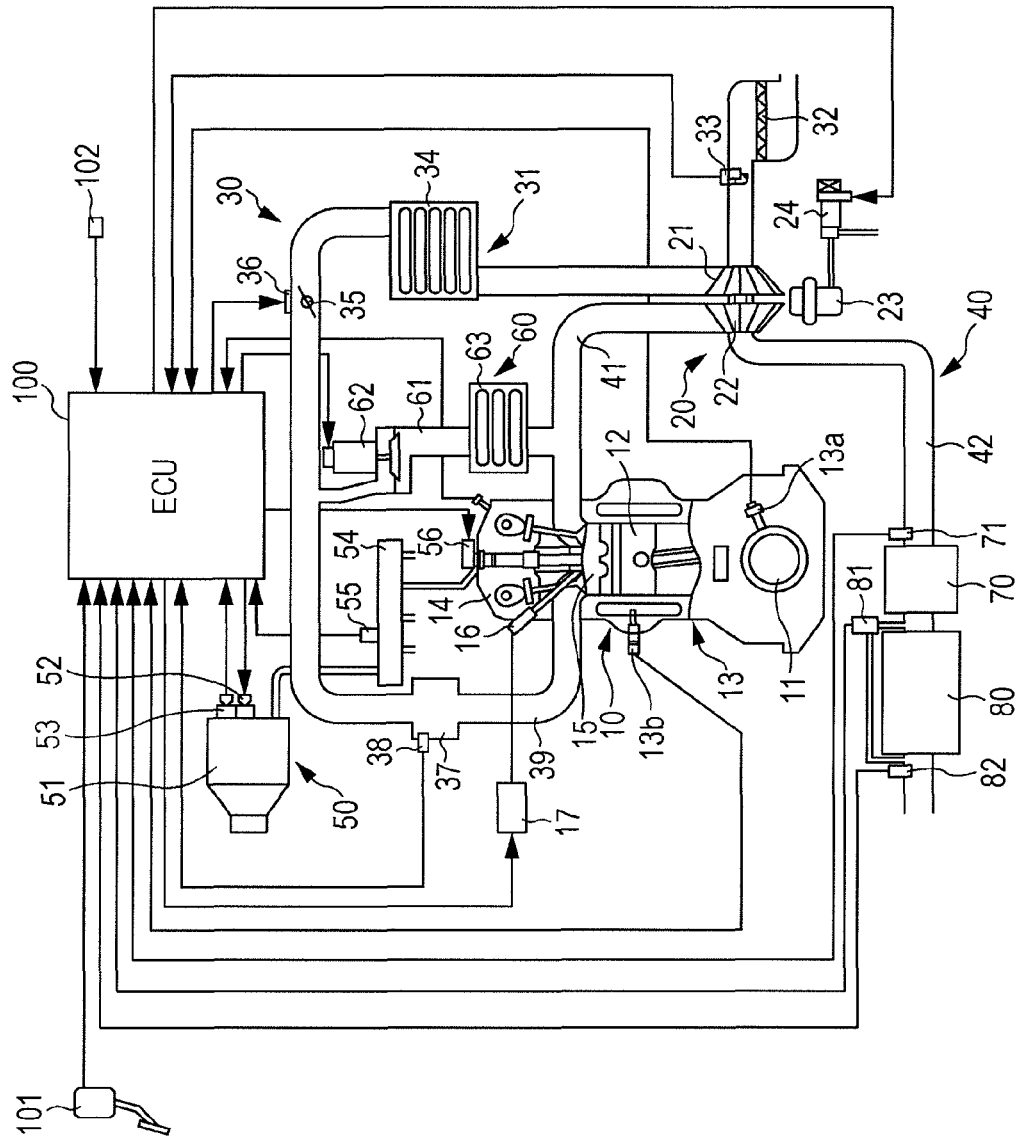
FIG. 1 is a schematic view showing a system configuration of an engine section in a vehicle equipped with a transmission control device for an automatic transmission according to an embodiment of the present invention.

FIG. 1 is a schematic view showing a system configuration of an engine section in a vehicle equipped with the transmission control device according to this embodiment.

An engine 10 includes a turbocharger 20, an intake system 30, an exhaust system 40, a fuel feed device 50, an exhaust gas recirculation (EGR) device 60, a diesel oxidation catalyst (DOC) 70, a diesel particulate filter (DPF) 80, and an engine control unit (ECU) 100.

The engine 10 is, for example, a four-stroke diesel engine used as a power source for running a vehicle, such as a passenger car.

The engine 10 includes a crankshaft 11, pistons 12, cylinder blocks 13, heads 14, combustion chambers 15, glow plugs 16, and a glow controller 17.

The crankshaft 11 is an output shaft of the engine 10.

Each piston 12 is a component that reciprocates within a cylinder and transmits combustion pressure to the crankshaft 11 via a connecting rod.

Each cylinder block 13 is an integrated unit constituted of a cylinder portion that accommodates the corresponding piston 12 and a crankcase portion that rotatably supports the crankshaft 11.

Each cylinder block 13 includes a crank-angle sensor 13a and a water-temperature sensor 13b.

The crank-angle sensor 13a detects an angular position of the crankshaft 11.

The water-temperature sensor 13b detects the temperature of a coolant circulating within a water jacket in the engine 10.

Each head 14 is provided at a top end of the piston 12 in the corresponding cylinder block 13 and includes an intake port, an exhaust port, and a valve driving mechanism that opens and closes an intake valve and an exhaust valve respectively provided in the intake port and the exhaust port.

Each combustion chamber 15 is formed between the top surface of the corresponding piston 12 and a part of the corresponding head 14 that faces this top surface.

Each glow plug 16 is a preheating device provided in the corresponding head 14 in a state such that an end of the glow plug 16 is exposed inside the corresponding combustion chamber 15.

The glow controller 17 controls the amount of electricity to be applied to each glow plug 16 in accordance with control by the ECU 100.

The turbocharger 20 compresses combustion air (new air) taken into the engine 10 by using the energy of exhaust gas (burned gas) of the engine 10.

The turbocharger 20 includes a compressor 21, a turbine 22, an actuator 23, and a negative-pressure control valve 24.

The compressor 21 is a centrifugal compressor that compresses the combustion air.

The turbine 22 is provided coaxially with the compressor 21, and is driven by the exhaust gas of the engine 10 and also drives the compressor 21. The turbine 22 is of a variable geometry type in which the geometry can be continuously varied by movable vanes provided at nozzles around a turbine wheel.

The actuator 23 is a negative-pressure-type actuator that drives the movable vanes of the turbine 22.

The negative-pressure control valve 24 is an electromagnetic valve that introduces negative pressure from a negative-pressure source (not shown) into the actuator 23 in accordance with control by the ECU 100.

If an actual boost pressure is low relative to a target boost pressure set by the ECU 100, the turbocharger 20 increases the rotation speed of the turbine 22 by closing the movable vanes and throttling the nozzles so as to perform control for increasing the boost pressure. However, even when such control is performed, if the rotation speed of the engine 10 is low, for example, a time response lag (turbo lag) from the start of acceleration up until the boost pressure increases becomes greater. When the turbo lag is large, an adverse effect is seen not only in the acceleration performance but also in the exhaust-gas processing performance. Therefore, in this embodiment, the boost pressure is increased at an early stage by performing collaborative control with a transmission 200, to be described later.

The intake system 30 introduces the combustion air into the engine 10.

The intake system 30 includes an intake duct 31, an air cleaner 32, an airflow meter 33, an intercooler 34, a throttle valve 35, an actuator 36, an intake chamber 37, an intake-pressure sensor 38, and an intake manifold 39.

The intake duct 31 is an air channel that guides the combustion air from the atmosphere and supplies the combustion air to the engine 10 via the compressor 21 of the turbocharger 20.

The air cleaner 32 includes a filter element that filters the air so as to remove dust and the like therefrom. The air passing through the air cleaner 32 is introduced into the compressor 21 of the turbocharger 20 so as to be compressed.

The airflow meter 33 is provided at an outlet of the air cleaner 32 and includes a sensor that detects the air flow rate.

The airflow meter 33 contains a built-in intake-temperature sensor that detects the intake temperature.

The airflow meter 33 functions as intake-state detecting means according to the present invention.

The intercooler 34 is a heat exchanger that cools the air exiting the compressor 21 of the turbocharger 20 by performing heat exchange with the traveling wind.

The throttle valve 35 is provided downstream of the intercooler 34 and adjusts the amount of intake air in the engine 10.

The actuator 36 opens and closes the throttle valve 35 in accordance with a control signal from the ECU 100.

The intake chamber 37 is an air chamber into which the air passing through the throttle valve 35 is introduced, and is connected to an intake port of the engine 10 via the intake manifold 39.

The intake-pressure sensor 38 is provided in the intake chamber 37 and detects the pressure within the intake chamber 37, which is substantially equal to the intake pressure in the engine 10.

The intake manifold 39 is a branch pipe that introduces air from the intake chamber 37 into an intake port of each cylinder of the engine 10.

The exhaust system 40 includes an exhaust manifold 41 and an exhaust pipe 42.

The exhaust manifold 41 is a pipe that gathers exhaust gas discharged from an exhaust port of each cylinder of the engine 10 and introduces the exhaust gas into the turbine 22 of the turbocharger 20.

The exhaust pipe 42 is a pipe that discharges the exhaust gas from the turbine 22 to the outside of the vehicle. The exhaust pipe 42 is provided with an exhaust-gas aftertreatment device, such as the DOC 70 and the DPF 80.

The fuel feed device 50 feeds fuel into each combustion chamber 15 of the engine 10. The fuel feed device 50 is a common-rail-type high-pressure fuel injection device that includes a supply pump 51, an intake-adjusting electromagnetic valve 52, a fuel-temperature sensor 53, a common rail 54, a fuel-pressure sensor 55, and an injector 56.

The supply pump 51 includes, for example, an inner-cam-type pressure feed system, and applies pressure to diesel oil, serving as fuel, so as to feed the diesel oil to the common rail 54.

The intake-adjusting electromagnetic valve 52 adjusts the amount of fuel taken into the supply pump 51 and is driven in accordance with a control signal from the ECU 100.

The fuel-temperature sensor 53 detects the temperature of the fuel in the supply pump 51.

The common rail 54 is an accumulator that accumulates the high-pressure fuel emitted from the supply pump 51.

The fuel-pressure sensor 55 detects the pressure (fuel pressure) of the fuel within the common rail 54. By performing feedback control on the aforementioned intake-adjusting electromagnetic valve 52 using the output from the fuel-pressure sensor 55, the opening of the intake-adjusting electromagnetic valve 52 is adjusted so that the fuel pressure is made equal to, for example, a predetermined target value set in accordance with the engine rotation speed and the engine load.

The injector 56 injects the fuel supplied from the common rail 54 into the combustion chamber 15 of each cylinder. The injector 56 has a valve member that is opened or closed by an actuator, such as a piezo element or a solenoid, and is opened in response to an injection pulse signal from the ECU 100. An injection timing and an injection amount of the injector 56 are controlled by the ECU 100.

The EGR device 60 is provided for the purpose of reducing the amount of NOx emission by suppressing the fuel temperature, and causes a portion of the exhaust gas of the engine 10 extracted from the exhaust manifold 41 to flow back into the intake duct 31.

The EGR device 60 includes an EGR path 61, an EGR control valve 62, and an EGR cooler 63.

The EGR path 61 is a pipe that introduces the exhaust gas from the exhaust manifold 41 into the intake duct 31.

The EGR control valve 62 adjusts the flow rate of exhaust gas (EGR amount) in the EGR path 61 in accordance with control by the ECU 100.

The EGR cooler 63 cools the exhaust gas flowing through the EGR path 61 by performing heat exchange with the traveling wind.

The DOC 70 is provided at the exhaust pipe 42 and mainly oxidizes hydrocarbon (HC) within the exhaust gas. The DOC 70 is formed by coating the surface of a ceramic substrate, such as a cordierite honeycomb structure, with a metal oxide material, such as noble metal or alumina, which may be, for example, platinum or palladium.

The DOC 70 is provided with a temperature sensor 71 that detects the temperature of exhaust gas at an inlet portion thereof.

The DPF 80 is provided downstream of the DOC 70 at the exhaust pipe 42 and includes a filter that filters the exhaust gas so as to capture particulate matter (PM). The PM includes soot, soluble organic fraction (SOF), and sulfate ($SO_4$).

The filter is of a so-called closed type (wall-flow type) formed by forming a honeycomb structure using a heat-resistant ceramic material, such as cordierite, and then sealing end surfaces thereof so that multiple cells, which are to serve as gas channels, at the inlet side and the outlet side are in a staggered configuration.

The DPF 80 includes a pressure-difference sensor 81 that detects a pressure difference between an inlet pressure and an outlet pressure, and a temperature sensor 82 that detects the temperature of exhaust gas at the outlet.

The ECU 100 collectively controls the aforementioned engine 10 and accessory components thereof, and includes an information processing unit such as a CPU, a storage unit such as a ROM or a RAM, an input/output interface, an A/D converter, a timer, a counter, and peripheral circuits such as various logic circuits.

In addition to the outputs from the aforementioned sensors, the ECU 100 receives outputs from an accelerator-pedal sensor 101 and an atmospheric-pressure sensor 102.

The accelerator-pedal sensor 101 serves as requested-torque detecting means configured to detect the position of an accelerator pedal operated by a driver so as to detect a driver's requested torque.

The atmospheric-pressure sensor 102 detects the atmospheric pressure in the atmosphere surrounding the vehicle.

The ECU 100 controls the opening of the throttle valve 35 as well as the fuel injection amount, the timing, and the fuel pressure of the fuel feed device 50 in accordance with a requested torque set in accordance with the output from the accelerator-pedal sensor 101.

Furthermore, the ECU 100 operates in cooperation with a TCU 250, to be described later, so as to serve as a part of the transmission control device for an automatic transmission according to the present invention, and functions as intake-state determining means configured to determine whether or not a predetermined target intake state is satisfied in the engine 10.

Figure 2:
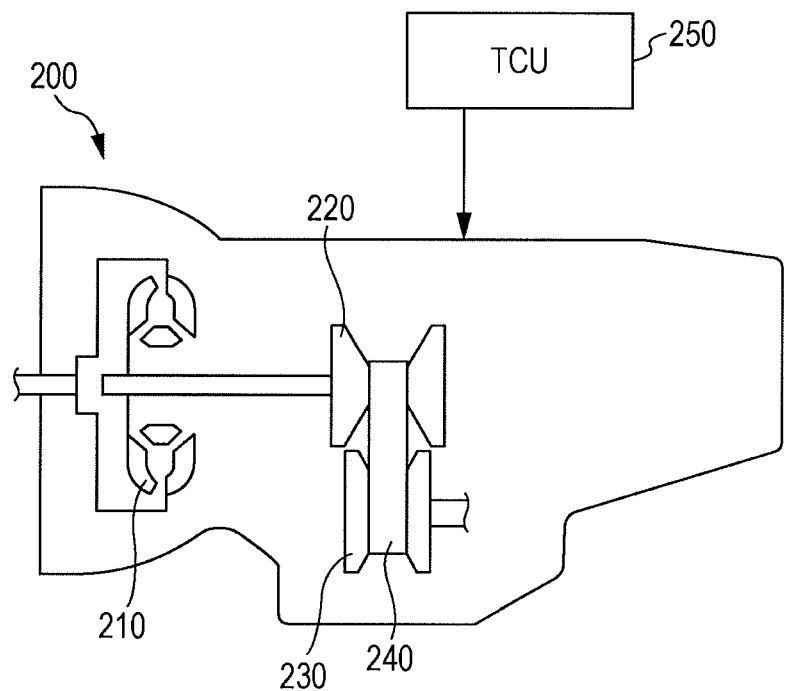
FIG. 2 is a schematic view showing a system configuration of a transmission section in the vehicle in this embodiment.

FIG. 2 is a schematic view showing a system configuration of a transmission section in the vehicle in this embodiment.

A transmission 200 is, for example, a chain-type continuously variable transmission (CVT) that increases or reduces the speed of an output from the engine 10.

The transmission 200 includes a torque converter 210, a drive pulley 220, a driven pulley 230, a drive chain 240, and a transmission control unit (TCU) 250.

The transmission 200 has a casing connected to a rear part (flywheel side) of the engine 10. The casing accommodates a transmission mechanism including the torque converter 210, the drive pulley 220, the driven pulley 230, and the drive chain 240, an AWD transfer case that distributes an output after a transmission operation to front and rear wheel accelerator differentials, and a front-wheel differential.

The torque converter 210 is a fluid coupling connected to a rear end of the crankshaft 11 of the engine 10 and includes a lock-up mechanism.

The drive pulley 220, the driven pulley 230, and the drive chain 240 operate in cooperation with each other so as to constitute a transmission mechanism unit of the chain-type continuously variable transmission (CVT).

The drive pulley 220 and the driven pulley 230 are provided adjacent to each other while central axes of rotation thereof are disposed parallel to each other. The drive chain 240 is bridged between the drive pulley 220 and the driven pulley 230 so as to perform power transmission therebetween.

The drive pulley 220 is connected to an output side of the torque converter 210.

The driven pulley 230 is connected to an input side of the AWD transfer case.

The drive pulley 220 and the driven pulley 230 each have a pair of tapered surfaces disposed facing each other in the axial direction. The drive chain 240 is sandwiched between these tapered surfaces. Each of the drive pulley 220 and the driven pulley 230 can change the distance between the facing tapered surfaces so as to change an effective diameter of the pulley in a stepless manner, thereby continuously changing a transmission gear ratio.

The TCU 250 serves as transmission control means configured to set the transmission gear ratio of the CVT on the basis of operational states, such as the engine rotation speed and the torque. A setting process of the transmission gear ratio will be described in detail later.

The ECU 100 and the TCU 250 are connected to each other via, for example, an in-vehicle local area network (LAN), such as a CAN communication system, so as to communicate with each other, and perform collaborative control for the engine 10 and the transmission 200.

The TCU 250 functions as transmission-pattern selecting means and transmission control means according to the present invention.

As an example of collaborative control mentioned above, the TCU 250 performs turbocharge-prioritized CVT control in the case of an insufficient amount of intake air that tends to cause the PM within the exhaust gas in the engine 10 to increase. Specifically, in this turbocharge-prioritized CVT control, a transmission pattern of the transmission 200 is changed so as to increase a reduction gear ratio, thereby increasing the frequency of use of a high rotation range of the engine 10.

FIG. 3 is a flow chart showing a transmission-pattern selecting process performed in the TCU 250.

This process will be described below in a step-by-step fashion.

Step S01: Detection of Accelerator Opening, Engine Rotation Speed, and Amount of Intake Air The ECU 100 detects an accelerator opening on the basis of an output from the accelerator-pedal sensor 101.

Furthermore, the ECU 100 detects the rotation speed (engine rotation speed) of the crankshaft 11 of the engine 10 on the basis of an output from the crank-angle sensor 13a. Moreover, the ECU 100 detects a current amount of intake air in the engine 10 on the basis of an output from the airflow meter 33.

Subsequently, the process proceeds to step S02.

Step S02: Calculation of Target Torque, Determination of Operating Range, and Setting of Minimum Amount of Intake Air The ECU 100 calculates a target torque of the engine 10 on the basis of the accelerator opening and the engine rotation speed detected in step S01. This target torque is read from, for example, a map preliminarily set in accordance with an operating range determined on the basis of the accelerator opening and the engine rotation speed.

Furthermore, the ECU 100 calculates a minimum amount of intake air on the basis of the target torque and the engine rotation speed detected in step S01. This minimum amount of intake air is read from, for example, a map preliminarily set in accordance with an operating range determined on the basis of the target torque and the engine rotation speed.

Subsequently, the process proceeds to step S03.

Step S03: Determination of Amount of Intake Air

The ECU 100 compares the actual amount of intake air in the engine 10 detected in step S01 with the minimum amount of intake air set in step S02. If the amount of intake air is higher than the minimum amount of intake air (i.e., if the target intake state is satisfied), the process proceeds to step S04. On the other hand, if the amount of intake air is lower than or equal to the minimum amount of intake air (i.e., if the target intake state is not satisfied), the process proceeds to step S05.

Step S04: Determination of Target Air Amount State and Normal CVT Control

The ECU 100 determines that the current intake state of the engine 10 is a target air amount state and makes the TCU 250 perform normal CVT control, to be described below, thus ending the process (return).

Step S05: Determination of Non-Target-Air-Amount State and Turbocharge-Prioritized CVT Control The ECU 100 determines that the current intake state of the engine 10 is not the target air amount state (insufficient amount of intake air) and makes the TCU 250 perform turbocharge-prioritized CVT control, to be described below, thus ending the process (return).

The normal CVT control and the turbocharge-prioritized CVT control mentioned above will be described below.

Figure 4A:
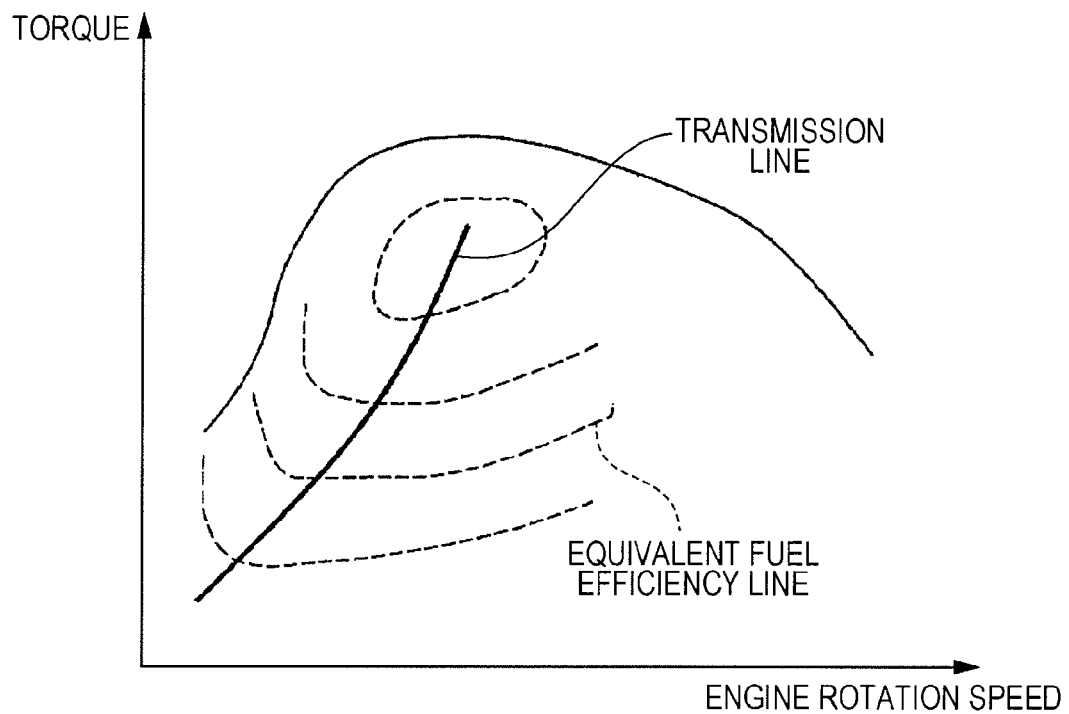
FIGS. 4A and 4B schematically illustrate examples of CVT transmission diagrams in the transmission control device for an automatic transmission according to the embodiment.
Figure 4B:
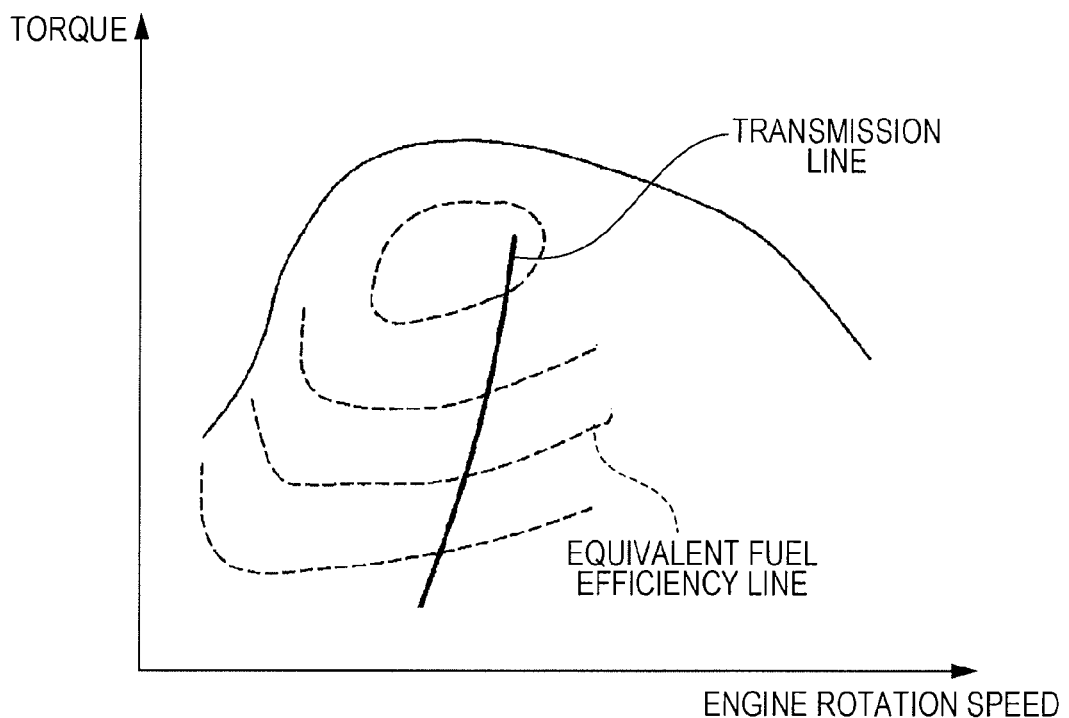

FIGS. 4A and 4B schematically illustrate examples of CVT transmission diagrams in the transmission control device for an automatic transmission according to this embodiment. Specifically, FIG. 4A corresponds to the normal CVT control, whereas FIG. 4B corresponds to the turbocharge-prioritized CVT control. In each of the diagrams, the abscissa denotes the engine rotation speed, whereas the ordinate denotes the torque (target torque or driver's requested torque) of the engine 10.

The outermost curve denotes a maximum torque curve of the engine 10, and dotted lines within the curve each denote an equivalent fuel efficiency line of the engine 10.

In each of the two kinds of control, the TCU 250 controls the transmission gear ratio of the transmission 200 so that a correlation between the engine rotation speed and the torque is made substantially similar to a transmission line shown with a thick line.

In the normal CVT control corresponding to a first transmission pattern according to the present invention, control is performed such that the engine rotation speed is reduced in a region where the torque is low so as to give priority to fuel efficiency, and the engine rotation speed is increased thereafter as the torque increases.

In contrast, in the turbocharge-prioritized CVT control corresponding to a second transmission pattern according to the present invention, control is performed such that the engine rotation speed is set to be higher than that in the normal CVT control even in a region where the torque is low so as to maintain the boost pressure at a high level of a predetermined value or greater, and the engine rotation speed is maintained in a high rotation range by reducing the rate of change of the engine rotation speed relative to increasing torque.

In the turbocharge-prioritized CVT control, the reduction gear ratio is increased relative to that in the normal CVT control, thereby generating the same output at a higher engine rotation speed and thus increasing the boost pressure of the turbocharger 20.

In the embodiment described above, when the amount of intake air in the engine 10 is lower than or equal to the minimum amount of intake air determined from the operating range of the engine 10, the transmission pattern of the transmission 200 is changed from the normal CVT control to the turbocharge-prioritized CVT control, thereby increasing the rotation speed of the engine 10 and thus increasing the boost pressure of the turbocharger 20 at an early stage after starting acceleration. This allows for combustion in a lean fuel state since the amount of intake air in the engine 10 is increased, thereby suppressing the occurrence of PM, such as soot, and thus improving the state of the exhaust gas.

On the other hand, when the amount of intake air in the engine 10 is higher than the minimum amount of intake air, the fuel-efficiency-prioritized normal CVT control that reduces the engine rotation speed is performed, thereby preventing a reduction in fuel efficiency of the vehicle. For example, if the intake state of the engine 10 is improved after performing the aforementioned turbocharge-prioritized CVT control, the transmission pattern is returned to the normal CVT control so that engine control and CVT control that can allow for both a favorable state of exhaust gas and good fuel efficiency can be achieved.

Modifications

The present invention is not limited to the above-described embodiment, and permits various modifications and alterations within the technical scope of the invention.

1. The configurations of the engine, the automatic transmission, and the accessory components thereof are not limited to those in the above-described embodiment, and may be modified where appropriate.

For example, although the automatic transmission is, for example, a chain-type CVT in the above embodiment, the present invention is not limited thereto. For example, the transmission may alternatively be a belt-type or toroidal-type CVT, a step-type automatic transmission (AT) that performs a transmission operation using multiple planetary pinion sets, a dual clutch transmission (DCT) that has independent clutches for individual transmission gear sets of odd-numbered gears and even-numbered gears and that performs a transmission operation by sequentially switching between these clutches, or an automated manual transmission (AMT) that drives a rear portion of a transmission similar to a manual transmission by using an actuator. Regarding the first and second transmission patterns when using a step-type automatic transmission other than a CVT, a transmission line for performing upshifting and downshifting may be changed so that the frequency of use of the high rotation range of the engine is higher for the second transmission pattern.

2. Although the intake state of the engine is determined on the basis of the amount of intake air detected by the airflow meter in the above embodiment, the present invention is not limited to this configuration. For example, the intake state may be determined on the basis of the boost pressure of the turbocharger or the pressure within the intake duct. As a further alternative, the intake state may be determined on the basis of a combination of these parameters.

3. Although the engine control unit determines the intake state of the engine in the above embodiment, such a determination function may be given to the transmission control unit or to another independent unit.

4. Although the above embodiment describes an example in which the two transmission patterns are simply switched between each other, the present invention is not limited thereto. For example, intermediate transmission patterns may be set in a multistep fashion between the two transmission patterns such that these transmission patterns are sequentially switched between each other. As a further alternative, the transmission patterns may be changed in a stepless fashion.

What is claimed is:

1. A transmission control device for an automatic transmission that changes the speed of rotation output from an engine having a turbocharger, the transmission control device comprising:

intake-state detecting means configured to detect an intake state of the engine, wherein the intake-state detecting means detects at least one of an amount of intake air in the engine, an intake pressure of the engine, and an air-fuel ratio of the engine;

intake-state determining means configured to determine whether or not a predetermined target intake state is satisfied on the basis of a detection result of the intake-state detecting means, wherein the intake-state determining means sets the target intake state on the basis of a target torque and an operating range of the engine;

transmission-pattern selecting means having a first transmission pattern for setting a transmission gear ratio in accordance with an operational state and a second transmission pattern for setting the transmission gear ratio such that an engine rotation speed is higher than that in the first transmission pattern, the transmission-pattern selecting means configured to select the first transmission pattern when the target intake state is satisfied and to select the second transmission pattern when the target intake state is not satisfied; and transmission control means configured to control a transmission mechanism unit of the automatic transmission on the basis of the transmission pattern selected by the transmission-pattern selecting means.

2. A transmission control device for an automatic transmission that changes the speed of rotation output from an engine having a turbocharger, the transmission control device comprising:

an intake-state detecting unit configured to detect an engine intake state, wherein the intake-state detecting unit detects at least one of an amount of intake air in the engine, an intake pressure of the engine, and an air-fuel ratio of the engine;

an intake-state determining unit configured to determine whether or not a predetermined target intake state is satisfied based on a detection result of the intake-state detecting unit, wherein the intake-state determining unit sets the target intake state on the basis of a target torque and an operating range of the engine;

a transmission-pattern selecting unit having a first transmission pattern for setting a transmission gear ratio in accordance with an operational state and a second transmission pattern for setting the transmission gear ratio such that an engine rotation speed is higher than that in the first transmission pattern, and selecting the first transmission pattern or the second transmission pattern when the target intake state is satisfied or not satisfied, respectively; and a transmission control unit configured to control a transmission mechanism unit of the automatic transmission based on the selected transmission pattern.

* * * * *